Sept. 22, 1953 T. J. LONGHURST 2,652,701
HEAT DISPERSING DRINKING CUP
Filed May 31, 1952
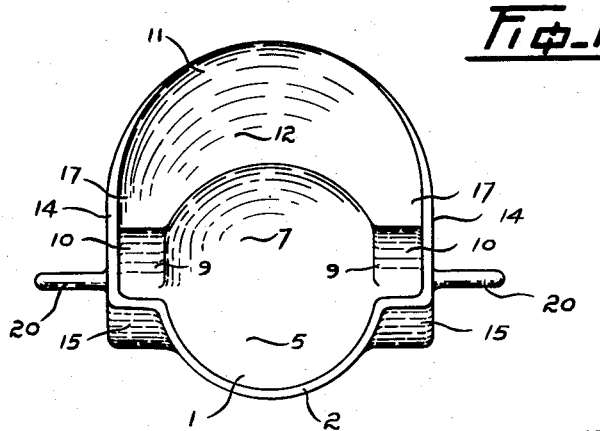
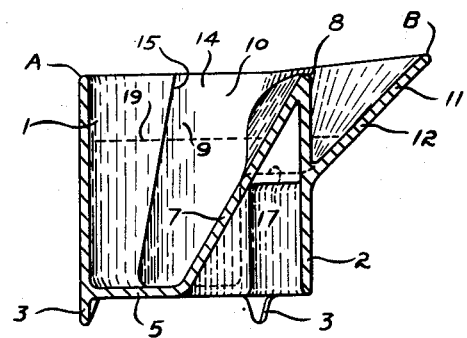
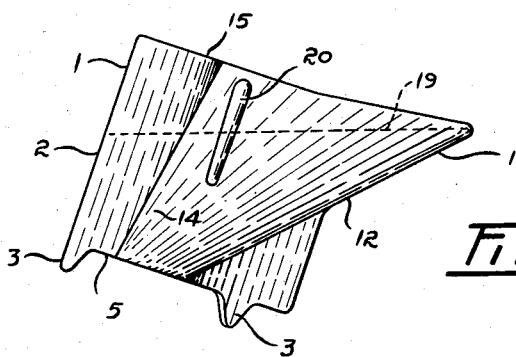
INVENTOR
THOMAS J. LONGHURST
ATTORNEY Patented Sept. 22, 1953

2,652,701

UNITED STATES PATENT OFFICE 2,652,701

HEAT DISPERSING DRINKING CUP

Thomas J. Longhurst, Vancouver,
British Columbia, Canada

Application May 31, 1952, Serial No. 290,937

2 Claims. (Cl. 65—13)

1

My invention relates to improvements in heat dispersing drinking cups.

Bus passengers very frequently order coffee at each coffee bar or restaurant where their bus stops to discharge or take on passengers and due to the shortage of these stops, the rush of people to be served and the heat of the coffee when put in front of the purchaser, many of the purchasers find it impossible to drink all the hot coffee served to them, so that much of it is thrown away soon after said passengers leave the counter where the coffee was served.

The invention is a cup having a broad lip on one side capable of absorbing and dissipating much of the heat of the coffee received into the cup, so that the purchaser can with comfort consume most of the coffee bought without undue haste or without wasting it.

For those people who can, and do prefer to drink their beverage hot, the coffee can be consumed before it reaches the cooling zones of the cup.

Referring to the accompanying drawings:

Figure 1 is a plan view of the invention.

Figure 2 is a side elevational view.

Figure 3 is a longitudinal sectional view showing the side pocket and spillway.

In the drawings like characters of reference indicate corresponding parts in each figure.

The numeral 1 indicates the main cup into which the beverage to be consumed is poured. This cup is provided with a cylindrical wall 2 having pads or feet 3 to allow free air circulation beneath the cup. A bottom wall 5 extends about half-way across the diameter of the cup and connects with an inclined wall 7 which extends to a height slightly less than the upper edge of the cylindrical wall 2 as at 8. The inclined wall 7 is preferably a plane surface connecting at its sides with the cylindrical wall 2 and opposing openings 9 extend downwardly in said cylindrical wall to form side chambers 10.

A lip or saucer 11 is formed around somewhat more than half the perimeter of the cylindrical wall 2. The centre portion 12 of the lip 11 is inclined to an angle of from forty to fifty degrees as shown particularly in Figure 3 and its side walls 14 extend beyond the openings 9 and are then inturned to the cylindrical wall 2 as at 15 to enclose the chambers 10. A small floor area 17 extends from each opening 9 to the inclined lip 11, see Figure 3.

The dotted line indicated by the numeral 19 is preferably the level to which the cup would normally be filled, so that if the purchaser was tardy in drinking the contents the heat loss to the beverage would only be equal to that suffered by liquid contact with main cup walls and a wall area surrounding the chambers 10. A pair of handles 20 are preferably provided for convenience in supporting and manipulating the drinking cup.

2

In use, with the main cup filled to the normal level 19 at or below the lowermost part of the centre of the lip 11 where the radiating area to the drinking cup surfaces will be at the minimum, so the beverage will retain its heat for a reasonable length of time. If the purchaser is not in a hurry or likes his beverage hot, he will drink from the point A of Figure 3, or the rim of the cylindrical wall 2 of the main cup, such use will keep the beverage from flowing onto the lip or saucer 11 and prevent heat loss from increase of wall area contacted. If the purchaser wishes to cool the beverage to a convenient temperature quickly, he will drink from the point B, tilting the device to the position shown in Figure 2, thus causing the hot beverage to spread over the extended area of the lip 11 before reaching the mouth and lose sufficient heat to reduce the beverage to a desired drinking temperature.

What I claim as my invention is:

1. A drinking vessel comprising a main cup having a substantially cylindrical side wall, a horizontal bottom wall extending substantially half way across the main cup, an inclined wall extending from an edge of the bottom wall up to a height slightly less than the upper edge of the cylindrical wall, a pair of side chambers between the ends of the inclined wall and the side wall of the main cup, a saucer like lip extending around at least half the perimeter of the cylindrical wall and across the chambers, said side chambers being in communication with the saucer like lip intermediate the height of the inclined wall whereby as the cup is tilted to drink from the lip liquid may flow from the main cup to said saucer like lip without flowing over the upper extremity of the inclined wall.

2. A drinking vessel as claimed in claim 1 wherein the communication between the side chambers and the saucer like lip are open topped passages.

THOMAS J. LONGHURST.

References Cited in the file of this patent

UNITED STATES PATENTS

| Number | Name | Date |
|---|---|---|
| D. 49,189 | Leachman | June 13, 1916 |
| 78,823 | Pember | June 9, 1868 |
| 213,455 | Schenck | Mar. 18, 1879 |
| 573,759 | Brown | Dec. 22, 1896 |
| 632,687 | Akard | Sept. 12, 1899 |
| 1,156,784 | King | Oct. 12, 1915 |
| 1,340,886 | Galleguillos | May 25, 1920 |
| 1,648,068 | Shockley | Nov. 8, 1927 |
| 2,355,010 | Pera | Aug. 1, 1944 |

FOREIGN PATENTS

| Number | Country | Date |
|---|---|---|
| 782,971 | France | Mar. 25, 1935 |